Sept. 16, 1924.
G. A. WIECHERT ET AL.
ELECTRIC HEATING DEVICE
Filed May 16, 1923
1,508,490
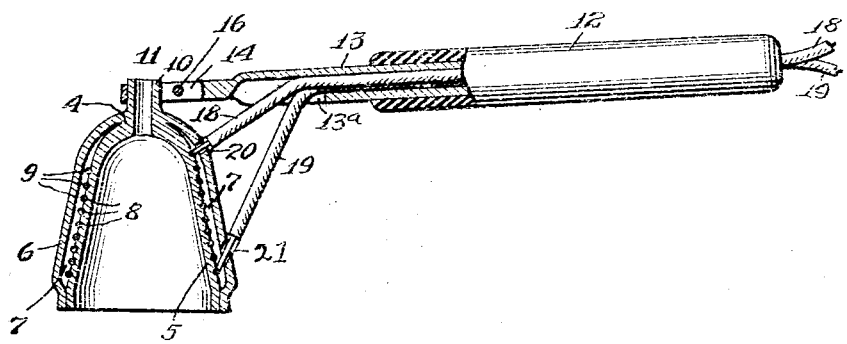
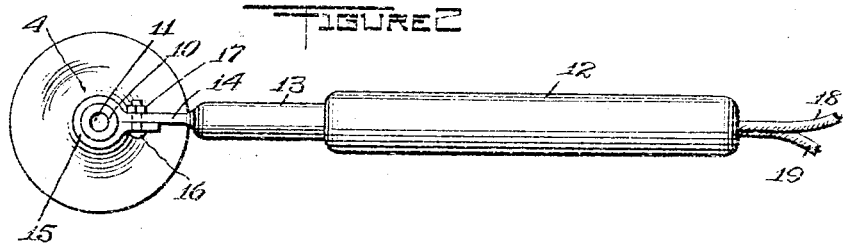
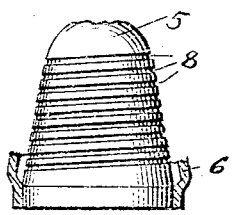
INVENTORS
George A. Wiechert
Jesse F. Judd
BY
Walton Harrison,
their ATTORNEY.

UNITED STATES PATENT OFFICE.

GEORGE A. WIECHERT, OF HOWARD BEACH, AND JESSE E. JUDD, OF NEW YORK, N. Y., ASSIGNORS TO CASTING RESEARCH, INC., OF NEW YORK, N. Y., A CORPORATION OF NEW YORK.

ELECTRIC HEATING DEVICE.

Application filed May 16, 1923. Serial No. 639,248.

*To all whom it may concern:*

Be it known that we, GEORGE A. WIECHERT and JESSE E. JUDD, both citizens of the United States, residing in New York State, the former in Howard Beach, in the county of Queens, and the latter in the city of New York and county of New York, have invented certain new and useful Improvements in Electric Heating Devices, of which the following is a full, clear, and concise description.

Our invention relates to electric heating devices of a kind suitable for melting precious metals in small quantities and porcelain, and for heating articles of small size, without using a flame.

More particularly stated our invention is a small electric heating device admitting of general use but especially adapted for heating gold in connection with dental casting machines.

It is a fact well known in this art that the heating and melting of gold, in connection with the use of dental casting machines, is usually accompanied by the collection, within the gold and upon its surface, of various impurities. These undesirable effects are mainly due to the use of a flame.

What we seek to do therefore is to produce an electric heating device of such form as to enable it to be easily handled and readily controlled, and which is capable of applying high degrees of heat so as to concentrate the same upon a small area or upon a small object, such as a little mass of gold to be melted, but without using a flame of any kind, and without doing anything to facilitate the undue oxidizing of the metal to be melted, and without causing the metal to be brought into contact with impurities.

Reference is made to the accompanying drawing forming a part of this specification, and in which like reference characters indicate like parts throughout all the figures.

Figure 1 is a substantially central vertical section through our device.

Figure 2 is a plan view of the same.

Figure 3 is a side elevation of the inner wall of the heating dome, partly broken away.

The heating dome appears at 4, and is provided with an inner wall 5 and an outer wall 6, separated by a vacuous space 7. The heating dome has a general bell shape.

The inner wall 5 has the form indicated more particularly Figures 1 and 3, and is provided with a spiral groove 8. Wound in this groove is a heating wire 9, which is thus formed into a coil of substantially frusto-conical form.

The heating dome is provided with a neck portion 10 integral with it and extending upwardly from it, and is further provided with a small opening 11 extending through this neck portion and thus entirely through the top of the dome.

A handle 12, made preferably of insulating material, as shown, has a tubular form, and extending through it is a metallic tube 13 carrying a shank 14 and a collar 15 integral with this shank. A bolt 16 extends through the shank 14 and the adjacent portion of the collar. Fitted upon the bolt 16 is a nut 17. The bolt and nut are used for tightening the collar 15 and thus firmly holding it upon the neck 10.

Extending through the tube 13, and projecting therefrom through an opening 13$^a$, are two insulated wires 18 and 19. These wires are connected with the ends of the heating wire, and for this purpose extend through the outer wall 6, by means of seals 20 and 21.

The heating dome is made of any material suitable for the purpose, such as fire clay, quartz, German quartz glass or the like, or even a refractory clay of a kind which may be maintained air-tight. The heating wire may be made of tungsten, platinum, Monel metal or the like, or it may be a filament of carbon or other material capable of withstanding a high degree of heat. The vacuous space 7 may be prepared after the manner of evacuating an incandescent bulb or a vacuum tube of any kind.

The operation of our device is as follows:

Electric current being supplied through the wires 18 and 19 so as to raise the temperature of the heating wire to bright incandescence and thus to heat the inner wall of the heating dome correspondingly, the operator grasps the handle and places the device in position, preferably fitting the heating dome neatly over the gold to be heated.

In using a dental casting machine, the heating dome is let down into the molding flask, so as to house within the inner wall of the heating dome the gold to be melted. The operator may from time to time observe the progress of the work, by peeping downwardly through the opening 11. This opening thus serves the purpose of a peep hole for enabling the operator to determine thus when to lift the heating dome away from the flask.

We do not limit ourselves to the particular use above mentioned for our device, nor to the employment of the particular materials mentioned, for the construction of the various parts, the scope of our invention being commensurate with our claims.

Having thus described our invention what we claim as new and desire to secure by Letters Patent is as follows:

1. A device of the character described comprising a handle, a heating dome mounted upon said handle and carried thereby, a heating wire carried by said heating dome, and electrical connections to said heating wire.

2. In an electric heating device the combination of a heating member having the proximate form of a dome and provided with an inner wall and an outer wall, and an electrically heated member for heating said inner wall.

3. In an electric heating device the combination of a heating dome provided with an inner wall and an outer wall separated by a vacuous space, and a heating coil carried by said inner wall for heating the same.

4. A device of the character described comprising a hollow heating member provided with an inner wall of refractory material and further provided with an outer wall separated from said inner wall by a vacuous space, and an electrically heated member located within said vacuous space and mounted upon said inner wall, for the purpose of heating said inner wall.

5. A device of the character described comprising an inner wall having the proximate form of a bell and provided with a groove, a heating wire wound within said groove and thus mounted upon said inner wall, and an outer wall encircling said inner wall and secured air-tight thereto, said inner wall and said outer wall being separated by a vacuous space, and electrical connections for said heating wire.

6. A device of the character described comprising a heating dome provided with an inner wall and an outer wall both made of refractory material, the inner wall being provided with a groove, the inner and outer walls being separated by a vacuous space, the heating dome being provided with a neck, a collar encircling said neck, a shank carrying said collar, a handle carrying said shank and used for the purpose of handling said heating dome, a heating wire wound within said groove and located within said vacuous space, and electrical connections extending through said handle and connected with said heating wire.

7. A device of the character described comprising a heating dome provided with a peep hole and further provided with an inner wall and an outer wall and with a vacuous space separating said inner wall from said outer wall, a heating member wound upon said inner wall, electric wires provided with portions extending through said outer wall and sealed relatively thereto, a handle connected with said heating dome said handle being provided with means for supporting said wires.

GEO. A. WIECHERT.
JESSE E. JUDD.